United States Patent
Yasuda et al.

(10) Patent No.: US 9,039,262 B2
(45) Date of Patent: May 26, 2015

(54) OPTICAL UNIT FOR A VEHICULAR LAMP

(71) Applicant: KOITO MANUFACTURING CO., LTD., Tokyo (JP)

(72) Inventors: Yuji Yasuda, Shizuoka (JP); Tatsuhiko Yamamichi, Shizuoka (JP); Shigeyuki Watanabe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 45 days.

(21) Appl. No.: 13/875,930

(22) Filed: May 2, 2013

(65) Prior Publication Data

US 2013/0235606 A1 Sep. 12, 2013

Related U.S. Application Data

(63) Continuation of application No. 13/228,897, filed on Sep. 9, 2011, now Pat. No. 8,534,888.

(30) Foreign Application Priority Data

Sep. 10, 2010 (JP) ................. 2010-203728
Sep. 10, 2010 (JP) ................. 2010-203729
Sep. 17, 2010 (JP) ................. 2010-209109

(51) Int. Cl.
*B60Q 3/06* (2006.01)
*B60Q 1/00* (2006.01)
(Continued)

(52) U.S. Cl.
CPC ........... *B60Q 1/0035* (2013.01); *F21S 48/1159* (2013.01); *F21S 48/1305* (2013.01); *F21S 48/155* (2013.01); *F21S 48/1216* (2013.01); *F21S 48/321* (2013.01); *F21V 13/04* (2013.01); *F21S 48/328* (2013.01); *B60Q 1/076* (2013.01)

(58) Field of Classification Search
USPC ............... 362/244, 245, 249.01, 249.02, 303, 362/305, 328, 507, 539, 545
See application file for complete search history.

(56) References Cited

U.S. PATENT DOCUMENTS 7,144,145 B2 * 12/2006 Watanabe et al. ............. 362/544
7,244,057 B2    7/2007 Watanabe et al.
(Continued)

FOREIGN PATENT DOCUMENTS

DE    10-2007-049309 A1    4/2009
EP         1770328 A1       4/2007
(Continued)

OTHER PUBLICATIONS

English Patent Abstract of JP 2007035547, Publication Date: Feb. 8, 2007 (1 Page).
(Continued)

*Primary Examiner* — Hargobind S Sawhney
(74) *Attorney, Agent, or Firm* — Osha Liang LLP

(57) ABSTRACT

An optical unit includes: a heat sink that radiates heat from a light source; and a base portion including a reflector mounting section, a lens mounting section and a connecting section connecting the reflector mounting section and the lens mounting section. The base portion is configured such that the light from the light source is reflected by a reflector mounted onto the reflector mounting section and is incident onto a projection lens mounted onto the lens mounting section. The heat sink is exposed to a space surrounded by the lens mounting section, the connecting section and the reflector mounting section.

8 Claims, 14 Drawing Sheets

(51) Int. Cl.
*F21S 8/10* (2006.01)
*F21V 13/04* (2006.01)
*B60Q 1/076* (2006.01)

(56) References Cited

U.S. PATENT DOCUMENTS

| | | | |
|---|---|---|---|
| 7,597,465 | B2 | 10/2009 | Inaba et al. |
| 7,665,873 | B2 | 2/2010 | Eberhardt et al. |
| 7,798,690 | B2 | 9/2010 | Watanabe et al. |
| 7,878,695 | B2 * | 2/2011 | Ishida ............ 362/539 |
| 7,896,512 | B2 * | 3/2011 | Tatara et al. ......... 362/43 |
| 7,922,377 | B2 * | 4/2011 | Yamamichi et al. ...... 362/545 |
| 7,963,684 | B2 * | 6/2011 | Staub et al. ............ 362/539 |
| 7,985,013 | B2 | 7/2011 | Yasuda |
| 8,414,171 | B2 * | 4/2013 | Kawamura ............ 362/545 |
| 8,465,189 | B2 * | 6/2013 | Inoue et al. ............ 362/547 |
| 2005/0094414 | A1 * | 5/2005 | Ishida et al. ........... 362/545 |
| 2007/0133220 | A1 | 6/2007 | Watanabe et al. |
| 2008/0062709 | A1 | 3/2008 | Mochizuki et al. |
| 2008/0266890 | A1 * | 10/2008 | Mochizuki et al. ...... 362/524 |
| 2008/0291688 | A1 * | 11/2008 | Higashi ............... 362/516 |
| 2010/0067249 | A1 | 3/2010 | Suzuki |
| 2010/0103691 | A1 | 4/2010 | Yasuda et al. |
| 2011/0032722 | A1 * | 2/2011 | Ishida et al. ........... 362/538 |
| 2011/0254446 | A1 | 10/2011 | Tominaga et al. |
| 2012/0007506 | A1 | 1/2012 | Ohmi et al. |
| 2012/0163008 | A1 * | 6/2012 | Matsumoto et al. ...... 362/507 |

FOREIGN PATENT DOCUMENTS

| | | |
|---|---|---|
| JP | 2005-310584 A | 11/2005 |
| JP | 2007-035547 A | 2/2007 |
| JP | 2008-047385 A | 2/2008 |

OTHER PUBLICATIONS

Office Action issued in counterpart Japanese Patent Application No. 2010-203728 dated Feb. 17, 2014 (6 pages).
Partial European Search Report issued in corresponding European Application No. 11180808.5, mailed on Feb. 19, 2015 (6 pages).

* cited by examiner

OPTICAL UNIT FOR A VEHICULAR LAMP

CROSS-REFERENCE TO RELATED APPLICATION(S)

This is a continuation application of U.S. patent application Ser. No. 13/228,897 filed on Sep. 9, 2011. The present disclosure relates to the subject matter contained in Japanese Patent Application No. 2010-203728 filed on Sep. 10, 2010, Japanese Patent Application No. 2010-203729 filed on Sep. 10, 2010, and Japanese Patent Application No. 2010-209109 filed on Sep. 17, 2010, which are incorporated herein by reference in its their entirety.

FIELD

An exemplary embodiment of the present invention relates to an optical unit and, specifically, an optical unit for use in a vehicle lighting apparatus.

BACKGROUND

There is known an optical unit for use in a vehicle lighting apparatus which reflects the light from a light source such as a semiconductor light emitting element by a reflector and radiates the reflected light through a projection lens in front of a vehicle. In this optical unit, its base portion, on which the projection lens and reflector are mounted, is structured such that it is connected to a heat sink including a portion for carrying thereon the semiconductor light emitting element.

As shown in FIG. 6 of JP-A-2007-35547, for example, a first aspect of this related art optical unit, a shade corresponding to the base portion includes a plane section disposed substantially horizontally and a bent section situated forwardly of the plane section and bent downward so as not to shield the light from the light source incident into the projection lens. Further a fastening screw extending from the back surface side of the heat sink and penetrating through the heat sink is threadedly engaged with a female screw section formed on the back surface side of the bent section, whereby the shade is mounted to the heat sink.

As shown in FIG. 6 of JP-A-2007-35547, for example, in a second aspect of this related art optical unit, the reflector is mounted through lance engagement on a shade corresponding to a base portion. Specifically, the shade includes rectangular projecting sections respectively formed on the right and left outer surfaces thereof, and the reflector includes, on the right and left outer surfaces thereof, hooks each having a rectangular opening. The rectangular projecting sections are respectively fitted into their associated rectangular openings of the hooks to thereby mount the reflector onto the shade.

As shown in FIG. 6 of JP-A-2007-35547, for example, in a third aspect of this related art optical unit, the shade corresponding to the base portion is mounted onto the heat sink using the fastening screw penetrating through the heat sink and extending from the back surface side thereof. Specifically, the shade includes a plane portion disposed substantially horizontally and a bent portion situated more forwardly than the plane portion and bent downwardly so as not to shut off the light from the light source incident onto the projection lens. Further, there is formed a female screw portion on the back surface side of the bent portion. The fastening screw extending from the back surface, side of the heat sink is threadedly engaged with the female screw portion to thereby mount the shade onto the heat sink.

In the first aspect of the related optical unit, there is a possibility that the sunlight incident through the projection lens from outside can be condensed near the bent section of the base portion to thereby raise the temperature of the base portion. Generally, since the base portion is made of resin, the base portion can be deformed or melted when a high temperature is caused. On the other hand, when the base portion is formed of highly heat-resisting material, for example, or when the bent section is shifted backward in the optical axis direction and is thereby made distant from the condensing portion of the sunlight, the deformation and melting damage of the base portion can be prevented. However, such sunlight concentration measures cause an increased manufacturing cost of the optical unit and an increased size thereof.

A first aspect of an exemplary embodiment of the present invention may solve some of the above problems. Thus, it is a first object of an exemplary embodiment of the invention to provide a technology which, without causing increased manufacturing cost of the optical unit and increased size, may avoid deformation or melted damage of the base portion by the concentration of the sunlight.

As described in the second aspect of the related optical unit, in the structure in which the reflector is mounted onto the base portion through lance engagement, when the hooks of the reflector are fitted into the rectangular projecting sections of the base portion, the reflector is inevitably deformed. Specifically, when the hooks of the reflector are pressed against the rectangular projecting sections of the base portion, the reflector is spread outwardly, while the front ends of the hooks are caused to move onto the rectangular projecting sections. When the front ends of the hooks climb over the rectangular projecting sections, the reflector is going to return its original shape, whereby the rectangular projecting sections fit into the rectangular openings of the hooks. Also, in this structure, in a state where the rectangular projecting sections fit in the rectangular openings of the hooks, the slightly outwardly spread state of the reflector is maintained. By deforming the reflector to spread outwardly, a reacting force capable of sandwiching the base portion can be generated in the reflector and thus the reflector can be fixed to the base portion due to such reacting force.

In the case that the reflector is deformed in this manner when mounting the reflector or after it has been mounted, there is a possibility that the reflection surface of the reflector can be deformed. When the reflection surface of the reflector is deformed, there is a fear that a light distribution pattern to be formed by a vehicle lighting apparatus can also be deformed. Therefore, in order to enhance the forming accuracy of the light distribution pattern, there is room for improvement in the related structure.

A second aspect of an exemplary embodiment of the present invention may solve the above problem. Thus, it is a second object of the invention to provide an optical unit which can enhance the forming accuracy of the light distribution pattern.

As described above in the third aspect of the related optical unit, in the structure in which the base portion is mounted on the heat sink by the fastening screw extending from the back surface side of the heat sink, the rear section of the base portion is connected to the heat sink. On the other hand, since a projection lens having a relatively large weight is mounted on the front end section of the base portion, the center of gravity of the base portion exists near the front section thereof. Therefore, the position of the connecting section for connecting together the base portion and heat sink is distant from the position of the center of gravity of the base portion. Thus, in order to enhance the rigidity of the optical unit against vibrations and shocks to be transmitted thereto while the vehicle is running, the related structure has some room for improvement.

A third aspect of an exemplary embodiment of the present invention aims at solving the above problems. Thus, it is a third object of the invention to provide a technology which can enhance the rigidity of an optical unit for use in a vehicle lighting apparatus.

SUMMARY

According to the first aspect of the invention, there is provided an optical unit including: a heat sink that radiates heat from a light source; and a base portion including a reflector mounting section, a lens mounting section and a connecting section connecting the reflector mounting section and the lens mounting section, wherein the base portion is configured such that the light from the light source is reflected by a reflector mounted onto the reflector mounting section and is incident onto a projection lens mounted onto the lens mounting section, and wherein the heat sink is exposed to a space surrounded by the lens mounting section, the connecting section and the reflector mounting section.

According to this aspect, it may be possible to avoid a fear that the base portion of the optical unit can be deformed or melted and damaged by the concentration of the sunlight, without causing the increased manufacturing cost of the optical unit and the increased size thereof.

In the above aspect, the heat sink may extend more forward in an optical axis direction of the optical unit than a front end of the reflector mounting section and may pass below the reflector mounting section. In this case, when compared with a structure in which radiating fins are provided only on the back surface side of the heat sink, the heat radiation property of the optical unit can be enhanced because the radiating fins can be provided at positions nearer to the light source.

In the above aspect, the heat sink may include a radiating fin, and the radiating fin might be viewable from outside the optical unit through the projection lens mounted on the lens mounting portion. In this case, the appearance of the optical unit can be innovative and thus the design of the optical unit can be enhanced.

In the above aspect, a front end of the reflector mounting portion may form a shade for forming a cutoff line of a light distribution pattern. Even in this case, it may be possible to avoid a fear that the base portion of the optical unit can be deformed or melted and damaged by the concentration of the sunlight, without causing the increased manufacturing cost of the optical unit and the increased size thereof.

According to the second aspect of the invention, there is provided an optical unit including: a reflector; a base portion including a reflector placement surface; a fixing pin; and a pin hole provided in the base portion at a position corresponding to the fixing pin, wherein the reflector includes an opposite surface that faces the reflector placement surface, wherein the fixing pin is provided in the opposite surface, and wherein the reflector is fixed to the base portion with the fixing pin inserted into the pin hole.

According to this aspect, there may be provided an optical unit which can enhance the forming accuracy of the light distribution pattern.

In the above aspect, the leading end portion of the fixing pin may also project from the pin hole, and the portion of the fixing pin projecting from the pin hole may be welded to the base portion. In this case, the reflector and base portion can be fixed more positively.

In the above aspect, a butt section may be provided in at least one of the opposite surface and reflector placement surface. When the butt section is provided in the opposite surface, the butt section may contact with the reflector placement surface whereby the reflector and the base portion are aligned with each other in a distance direction. When the butt section is provided in the reflector placement surface, the butt section may be contacted with the opposite surface whereby the reflector and the base portion may be aligned with each other in the distance direction. In this case, the forming accuracy of the light distribution pattern might be further enhanced.

In the above aspect, the fixing pin may also include, in an area between the opposite surface and the reflector placement surface, a portion having a larger diameter than a diameter of the pin hole. In this case, since only the leading end portion of the fixing pin located forward of the portion having a larger diameter than the pin hole can be inserted into the pin hole, it might be possible to prevent the excessive insertion of the fixing pin into the pin hole and, consequently, deformation of the reflector may be prevented.

In the above aspect, the portion of the fixing pin having the larger diameter than the diameter of the pin hole may also include a surface parallel to the reflector placement surface, and a space may be formed between the parallel surface and the reflector placement surface. In this case, when the reflector is pressed against the base portion, the portion of the fixing pin having a larger diameter than the pin hole can be surface contacted with the reflector placement surface, and thereby may positively prevent the excessive insertion of the fixing pin into the pin hole.

According to the third aspect of the invention, there is provided an optical unit for use in a vehicle lighting apparatus, the optical unit including: a heat sink that radiates heat from a light source; a base portion including a reflector mounting section, a lens mounting section and a connecting section connecting the reflector mounting section and the lens mounting section; and a connecting mechanism between the heat sink and the base portion, wherein the base portion is configured such that light from the light source is reflected by a reflector mounted onto the reflector mounting section and is incident onto a projection lens mounted onto the lens mounting section, wherein the heat sink has an extension portion that extends more forward in an optical axis direction of the optical unit than a front end of the reflector mounting section and passes below the reflector mounting section, and wherein the connecting mechanism connects the connecting section and the extension portion.

According to this aspect, the rigidity of an optical unit for use in a vehicle lighting apparatus can be enhanced.

In the above aspect, the connecting mechanism may also be provided at a position where the connecting mechanism overlaps a projection lens mounted onto the lens mounting section when the optical unit is viewed from its front. In this case, the size of the optical unit may be reduced.

In the above aspect, the connecting mechanism may also includes a screw having a head portion, a screw insertion hole provided in the connecting section, and a screw receiving section provided in the extension section, wherein the screw may be inserted through the screw insertion hole and is threadedly engaged with the screw receiving section, and the connecting section may be put between the head portion and extension section. In this case, since radiating fins can also be provided in the back surface side portion of the screw receiving section of the extension section, the heat radiating property of the optical unit can be enhanced.

In the above aspect, the connecting portion may also include multiple projecting portions, which are respectively provided in a periphery of the screw insertion hole and which contact with and are compressed by the head portion. At least one of the base portion and the heat sink may include a butt section contactable with the other. At least one of the projecting sections may also extend substantially perpendicular to a straight line passing through a center of the screw insertion hole and a center of the butt section. In this case, since the amount of force of the screw head portion transmitted to the butt section to compress the projecting sections can be increased, the heat sink and base portion can be aligned with each other in the distance direction with high accuracy.

In the above aspect, the butt section may also be disposed in a peripheral edge of the screw insertion hole, and some of the projecting sections may also extend radially with respect to the center of the screw insertion hole. In this case, it might be possible to prevent the force of the screw head portion for pressing and compressing the projection sections from being excessively transmitted to the butt sections disposed in the peripheral edge of the screw insertion hole.

According to the first aspect of the present invention, it may be possible to avoid a fear that the base portion of the optical unit can be deformed or melted and damaged by the concentration of the sunlight, without causing the increased manufacturing cost of the optical unit and the increased size thereof.

According to the second aspect of the invention, it may be possible to provide an optical unit which can enhance the forming accuracy of a light distribution pattern.

According to the third aspect of the invention, it may be possible to enhance the rigidity of an optical unit for use in a vehicle lighting apparatus.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Now, description will be given below of the invention using a suitable embodiment thereof with reference to the accompanying drawings. The same or equivalent composing elements, members and processes shown in the respective drawings are given the same designations and thus the duplicate description thereof will be omitted accordingly. Also, the embodiment is an example of the invention but should not be used to limit the invention; and thus, all characteristics and their combinations described in the present embodiment are not always the essential elements of the invention.

First Embodiment

Figure 1:
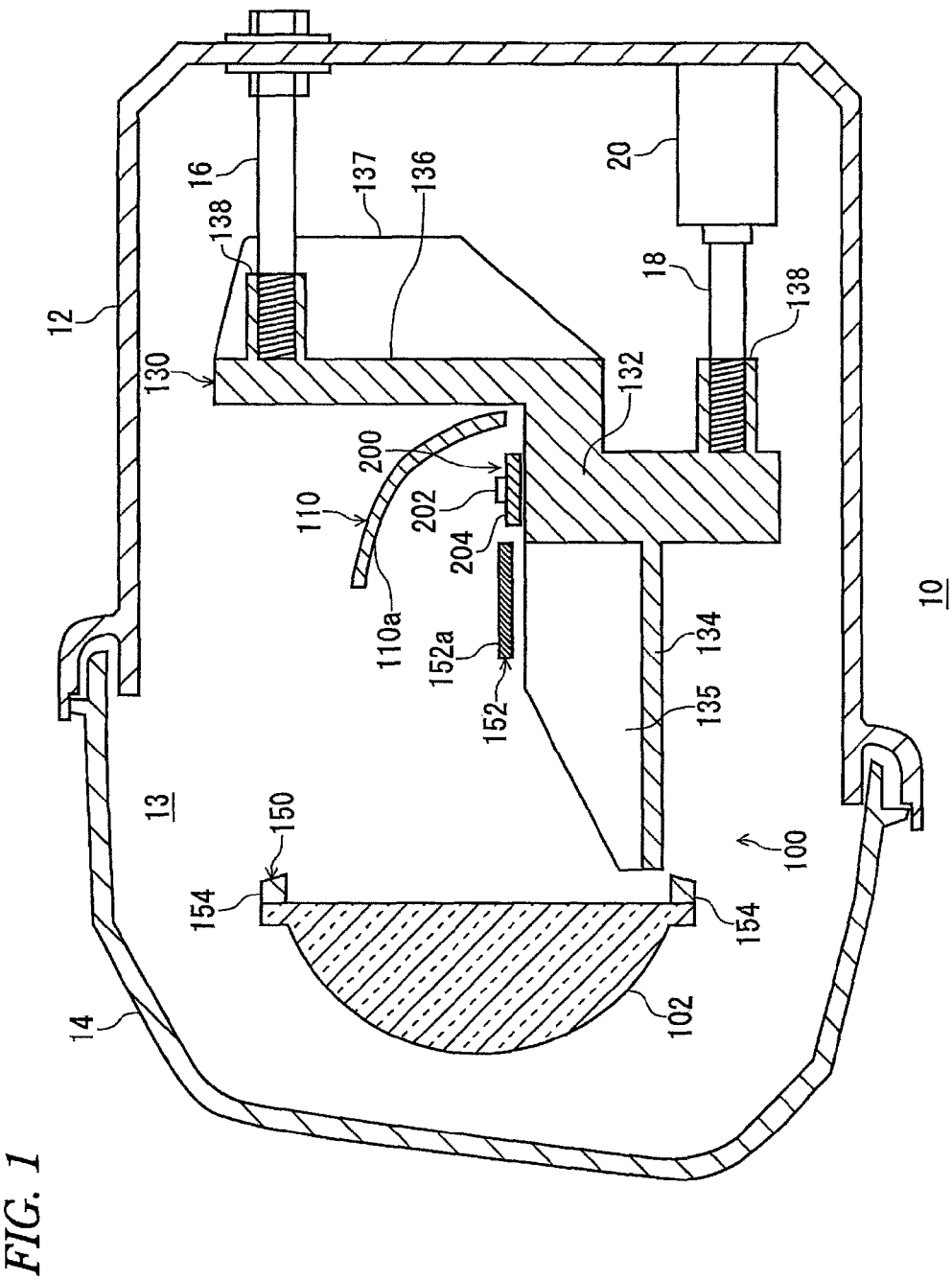
FIG. 1 is a schematic partial section view of the internal structure of a vehicle headlight apparatus serving as a vehicle lighting apparatus including an optical unit according to a first embodiment of the invention.
Figure 2:
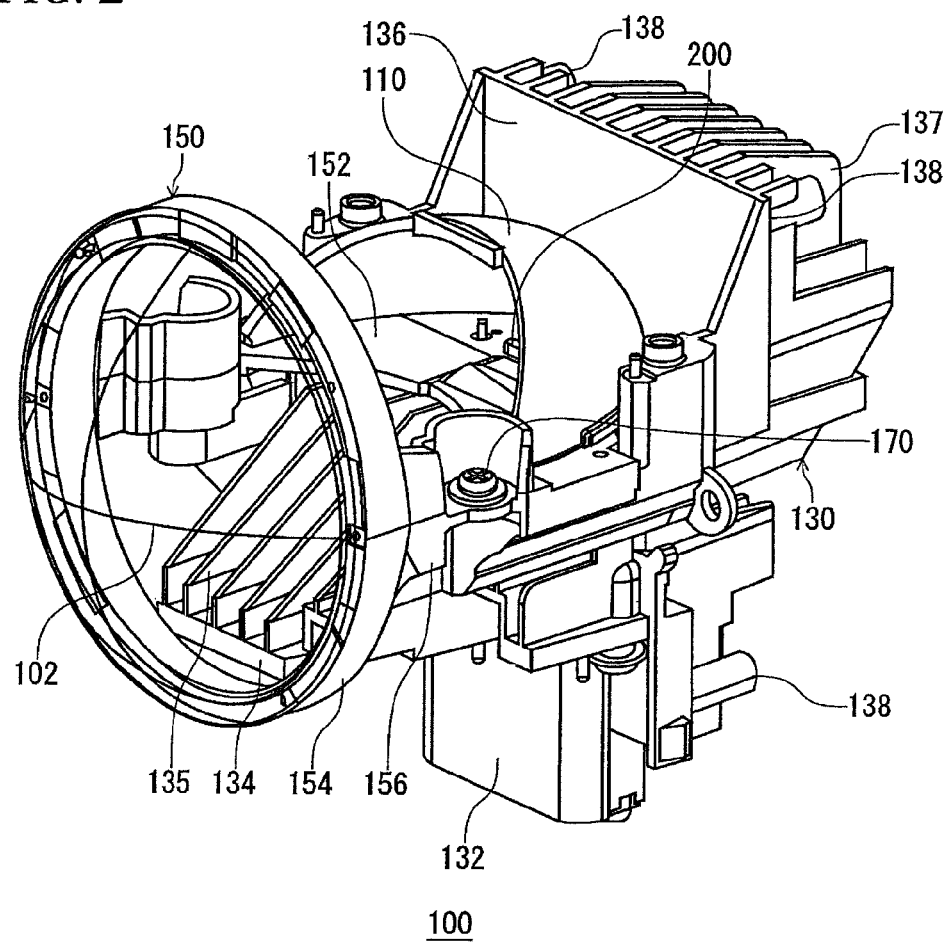
FIG. 2 is a schematic perspective view of the optical unit according to the first embodiment when viewed obliquely from above.

FIG. 1 is a schematic partial section view of the internal structure of a vehicle headlight apparatus serving as a vehicle lighting apparatus including an optical unit according to a first embodiment of the invention. FIG. 2 is a schematic perspective view of the optical unit according to the first embodiment when viewed obliquely from above. Here, the vehicle headlight apparatus includes a pair of symmetrically formed headlight units. In the case that the vehicle headlight apparatus is mounted on a vehicle, one of the headlight units is provided in the left front portion of the vehicle, while the other is provided in the right front portion of the vehicle. FIG. 1 shows the structure of either one of the right and left headlight units used as the vehicle headlight apparatus.

As shown in FIG. 1, a vehicle headlight apparatus 10 according to the present embodiment includes a lamp body 12 having an opening formed on the front side of the vehicle, and a light transmission cover 14 mounted so as to cover the opening of the lamp body 12. The light transmission cover 14 is made of resin or glass having a light transmissible property. Within a lamp chamber 13 constituted of the lamp body 12 and light transmission cover 14, there is stored an optical unit 100.

As shown in FIGS. 1 and 2, the optical unit 100 is an optical unit of a so called projector type for use in a vehicle lighting apparatus and, specifically, it includes a reflector 110, a heat sink 130 and a base portion 150. Also, the optical unit 100 according to the present embodiment is an optical unit capable of forming a low beam light distribution pattern. The optical unit 100 is disposed such that its optical axis extends in the longitudinal direction of the vehicle, while the optical unit 100 is connected to the lamp body 12.

The reflector 110 has a reflection surface 110a used to reflect light emitted from a light source module 200 (light source). The heat sink 130 includes a light source carrying portion 132 on which the light source module 200 can be carried, an extension portion 134 extending from the front surface of the light source carrying portion 132 forwardly in the optical axis direction, and a radiating fin 135 provided in the extension portion 134. Also, the heat sink 130 further includes a back surface portion 136 extending upwardly from the back surface upper section of the light source carrying portion 132, and a radiating fin 137 provided in the back surface portion 136. The base portion 150 includes a reflector mounting section 152 having a reflector placement surface 152a, a lens mounting section 154 for mounting the projection lens 102, and a connecting section 156 for connecting together the reflector mounting section 152 and lens mounting section 154.

The heat sink 130 functions as a support member for supporting the reflector 110 and base portion 150, while the base portion 150 with the reflector 110 mounted thereon is connected to the heat sink 130 by a connecting mechanism 170. Also, the heat sink 130 includes two screw holes 138 respectively formed in the back surface lower section of the light source carrying portion 132 and in the back surface of the back surface portion 136, while an aiming screw 16 penetrating through the lamp body 12 and extending forward therefrom and a leveling shaft 18 are threadedly engaged with their associated screw holes 138 respectively. In this manner, the heat sink 130 is mounted onto the lamp body 12, whereby the optical unit 100 is mounted onto the lamp body 12.

The leveling shaft 18 is connected to a leveling actuator 20. The vehicle headlight apparatus 10 is structured such that the optical axis of the optical unit 100 can be adjusted in the horizontal direction and in the vertical direction by the aiming screw 16, leveling shaft 18 and leveling actuator 20.

Figure 3A:
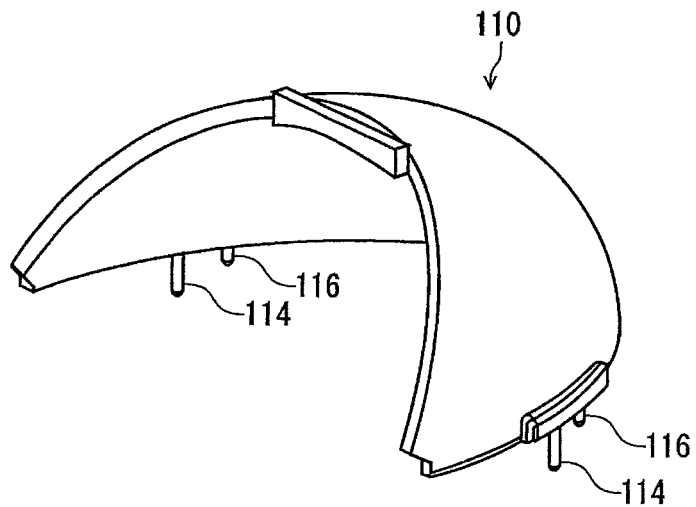
FIG. 3A is a schematic perspective view of a reflector when viewed obliquely from above.
Figure 3B:
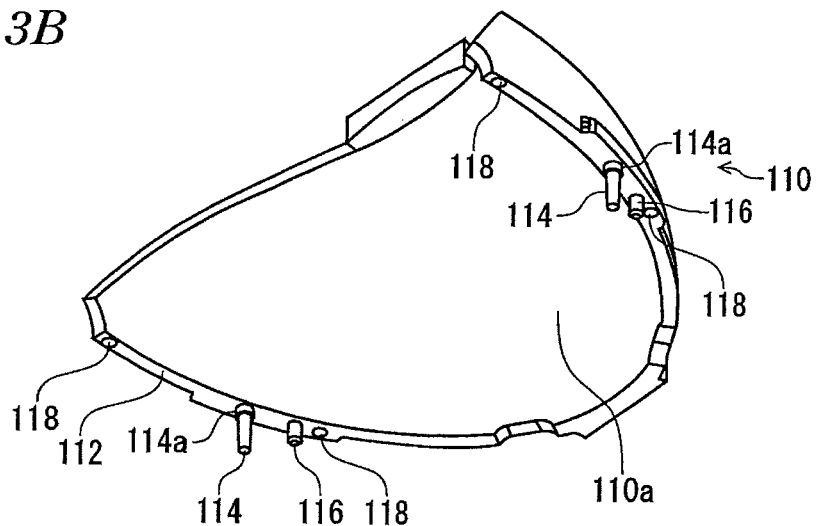
FIG. 3B is a schematic perspective view of the reflector when viewed obliquely from below.
Figure 3C:
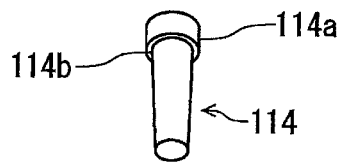
FIG. 3C is a schematic perspective view of a fixing pin when viewed obliquely from below.
Figure 4:
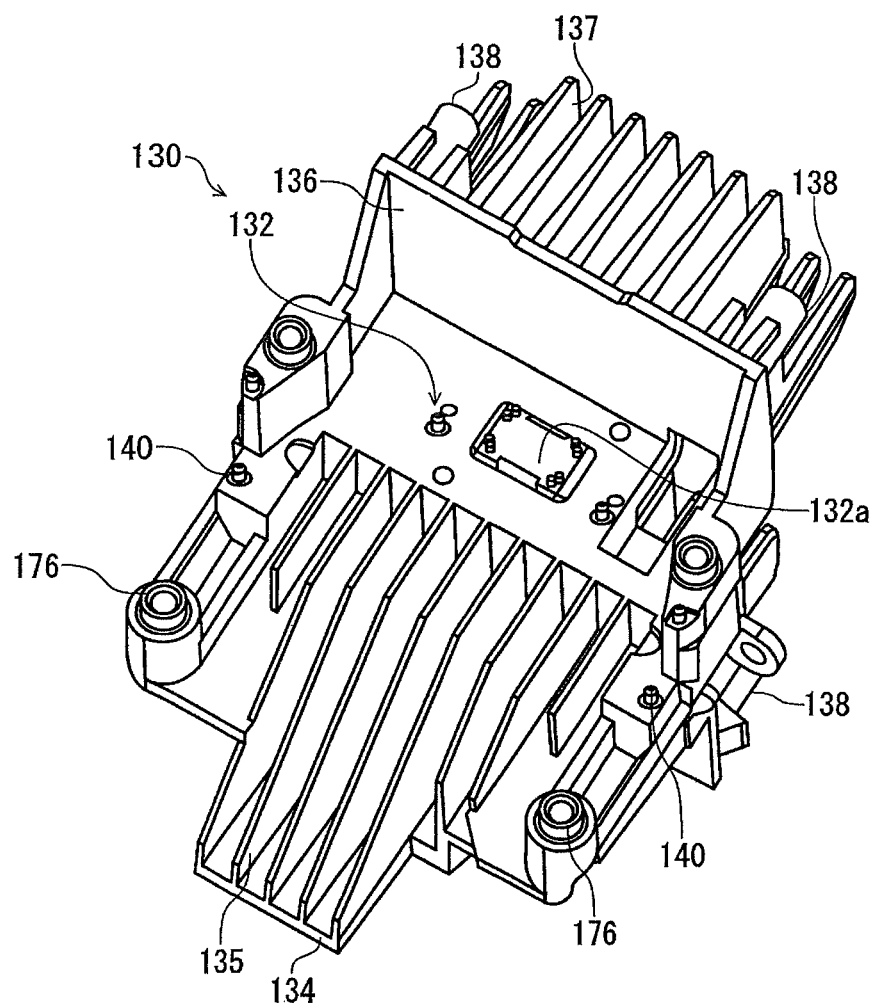
FIG. 4 is a schematic perspective view of a heat sink when viewed obliquely from above.
Figure 5A:
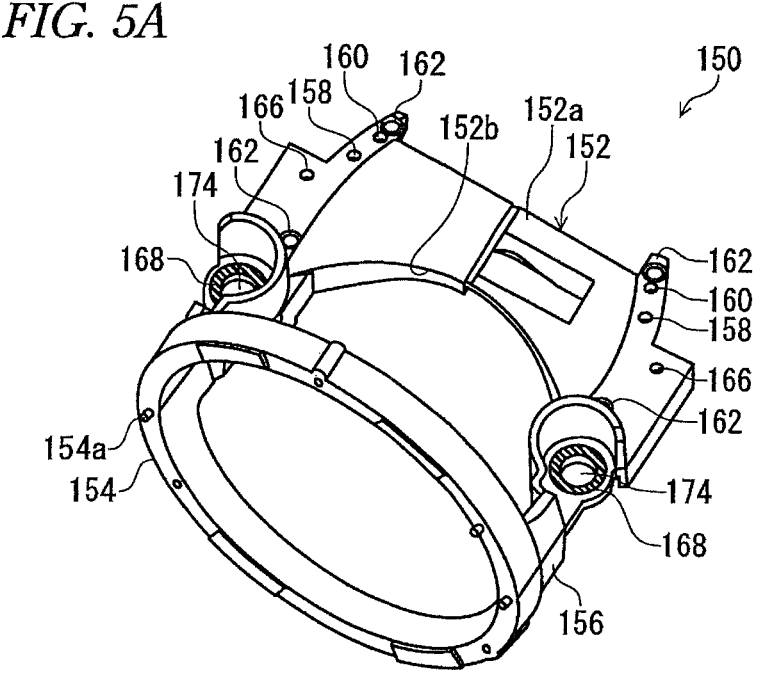
FIG. 5A is a schematic perspective view of the base portion of the optical unit when viewed obliquely from above.
Figure 5B:
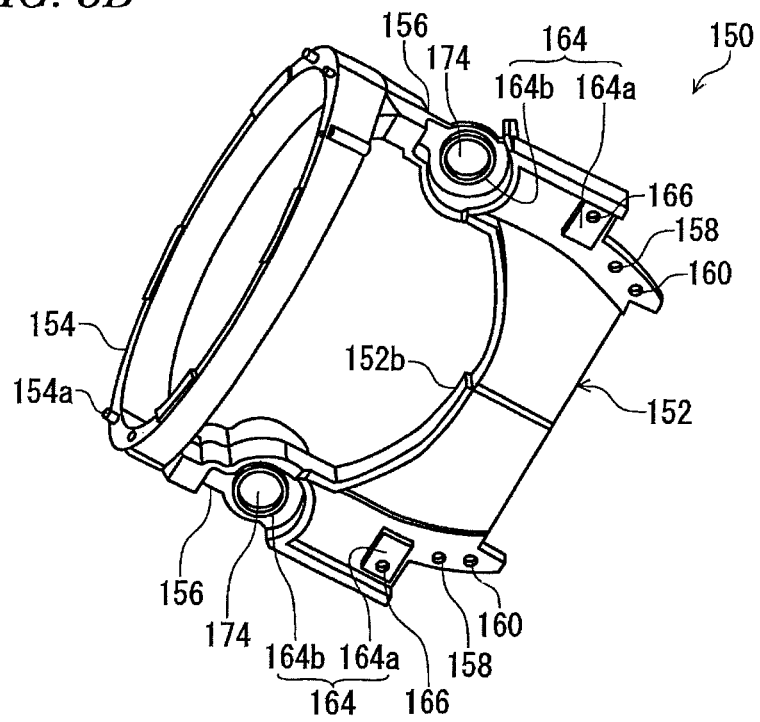
FIG. 5B is a schematic perspective view of the base portion when viewed obliquely from below.
Figure 6A:
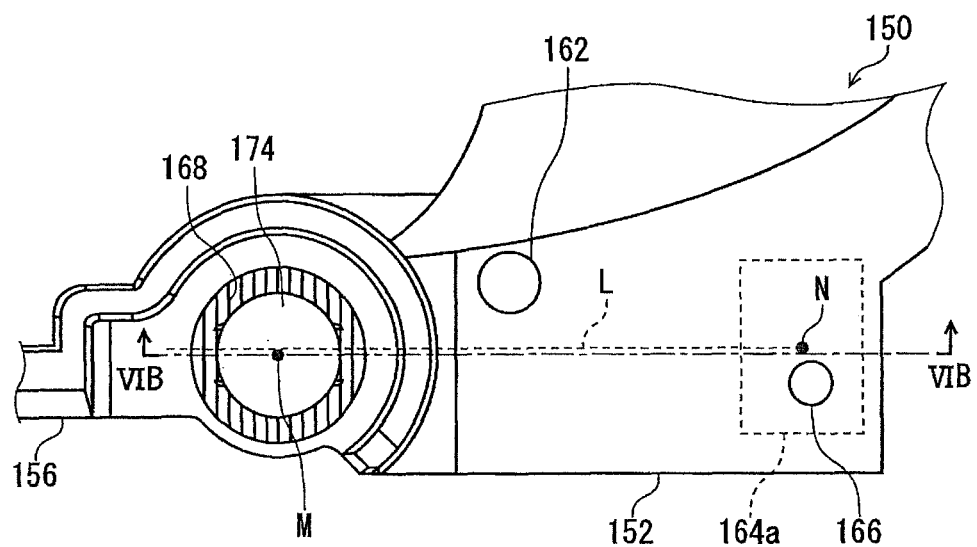
FIG. 6A is a schematic plan view of the vicinity of the connecting section of the base portion.
Figure 6B:
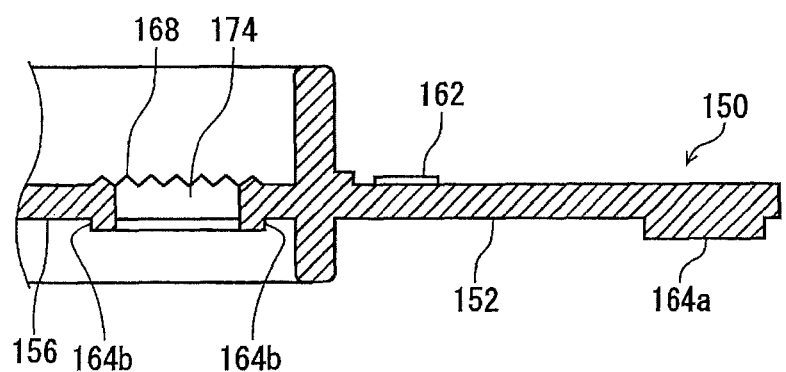
FIG. 6B is a schematic section view taken along a VIB-VIB line shown in FIG. 6A.

Next, with reference to FIGS. 3A to 3C, FIG. 4, FIGS. 5A and 5B, and FIGS. 6A and B, description will be given below specifically of the structures of the respective portions of the optical unit 100. FIG. 3A is a schematic perspective view of a reflector when viewed obliquely from above, FIG. 3B is a schematic perspective view of the reflector when viewed obliquely from below, and FIG. 3C is a schematic perspective view of a fixing pin when viewed obliquely from below. FIG. 4 is a schematic perspective view of a heat sink when viewed obliquely from above. FIG. 5A is a schematic perspective view of the base portion when viewed obliquely from above, and FIG. 5B is a schematic perspective view of the base portion when viewed obliquely from below. FIG. 6A is a schematic plan view of the vicinity of the connecting section of the base portion, and FIG. 6B is a schematic section view taken along the VIB-VIB line shown in FIG. 6A.

As shown in FIGS. 3A and B, the reflector 110 is a reflection member including on the inside thereof the reflection surface 110a which is constituted of, for example, a portion of a spheroid. The reflector 110 is disposed more backward of the vehicle than the projection lens 102 in such a manner that the first focus of the reflection surface 110a is situated in the vicinity of the light source module (see FIG. 1) and the second focus of the reflection surface 110a is situated in the vicinity of the rear focus of the projection lens 102 (see FIG. 1).

The reflector 110 includes an opposite surface 112 which is allowed to face the reflector placement surface 152a in a state where the reflector 110 is mounted on the reflector mounting section 152 of the base portion 150. On the opposite surface 112, there are provided a fixing pin 114 used to fix the reflector 110 and base portion 150, a positioning pin 116 used to determine the positions of the reflector 110 and base portion 150 in the horizontal direction, and a projection-shaped butt portion 118 used to determine the positions of the reflector 110 and base portion 150 in the distance direction (vertical direction). In this embodiment, the opposite surface 112 extends substantially in the form of an elliptic arc and is disposed such that it has axial symmetry with the optical axis. Each of a fixing pin 114 and a positioning pin 116 are respectively provided both on the right and the left sides with the optical axis between the two sides. A pair of butt portions 118 is provided on both the right and the left sides with the optical axis between the two sides. Of the two butt portions 118 on each side, one is disposed more forwardly with respect to the vehicle than the fixing pin 114 and positioning pin 116, while the other butt portion 118 is disposed more rearward with respect to the vehicle than the fixing pin 114 and positioning pin 116.

As shown in FIG. 3C, the fixing pin 114 has a large diameter portion 114a, which has a diameter larger than the diameter of a pin hole 158 (which will be discussed later) formed in the base portion 150. The large diameter portion 114a is disposed at the base end portion of the fixing pin 114, that is, at a position where it can contact with the opposite surface 112. Also, the large diameter portion 114a has a parallel surface 114b. The parallel surface 114b is a surface which is allowed to be parallel to the reflector placement surface 152a when the reflector 110 is mounted on the reflector mounting section 152 of the base portion 150. That is, the fixing pin 114 has on the side surface thereof a step the diameter which is larger on the base end side thereof than on the leading end side thereof. The base end side of the fixing pin 114 formed from the step provides the large diameter portion 114a. Further, the parallel surface 114b is provided by the surface that connects the side surface of the large diameter portion 114a with the side surface of the fixing pin 114, and is nearer to the leading end of the fixing pin than the large diameter portion 114a.

The height of the fixing pin 114 is greater than the thickness of the section of the base portion 150 where the pin hole 158 is formed, i.e., the length of the pin hole 158. Also, the height of the large diameter portion 114a is set as the height which, in a state where the reflector 110 is mounted on the reflector mounting section 152 of the base portion 150, makes it possible to form a space between the parallel surface 114b and reflector placement surface 152a.

The heat sink 130 is a member used to radiate the heat of the light source module 200. As shown in FIG. 4, the heat sink 130 includes a light source carrying portion 132 for carrying the light source module 200 thereon. The light source carrying portion 132 has a substantially cuboid-like shape (see FIGS. 1 and 2) and includes, on the upper surface thereof, alight source carrying surface 132a for carrying the light source module 200 thereon. On the side surface of the light source carrying portion 132 facing forwardly of the vehicle, there is formed a flat-plate shaped extension section 134 which extends forwardly in the optical axis direction up to the vicinity of the projection lens 102. In this extension section 134, its main surface extends substantially horizontally; and, on the upwardly facing main surface, there are provided multiple radiating fins 135 such that they are arranged in the vehicle right and left direction. The radiating fins 135 respectively extend in the vehicle longitudinal direction and the back surfaces of the fins are contacted with the side surface of the light source carrying portion 132 that faces forwardly of the vehicle. Also, the height of the upper surface of each radiating fin 135 is substantially equal to that of the upper surface of the light source carrying portion 132. Further, the vehicle forward side of the fin 135 decreases in height as it goes forwardly of the vehicle in order not to shut off the light which is reflected by the reflector 110 and is guided toward the projection lens 102.

The extension portion 134 includes, in the sections thereof existing more outwardly in the vehicle right and left direction than the radiating fins 135, screw receiving sections 176 which constitute a connecting mechanism 17 (which will be discussed later). The screw receiving sections 176 are formed on both the right and left sides. The extension portion 134 also includes, in the sections thereof existing more rearward with respect to the vehicle than the screw receiving sections 176 formed in the vehicle right and left direction two end portions, positioning pins 140 which are used to determine the positions of the heat sink 130 and base portion 150 in the horizontal direction. The positioning pins 140 are provided apiece on the right and left sides.

The light source carrying portion 132 includes, in the side surface thereof that faces reward with respect to the vehicle, a flat-plate shaped back surface section 136 which extends in the vehicle vertical direction. The main surface of the back surface section 136 is disposed to face in the vehicle front and back directions. On the portion of the main surface that faces in the vehicle back direction, there are provided multiple radiating fins 137 in such a manner that they are arranged in the vehicle right and left direction. Also, a screw hole 138 into which the aiming screw 16 (see FIG. 1) can be threadedly engaged is formed in the portion of the main surface of the back surface section 136 which faces rearward with respect to the vehicle. A screw hole 138 into which the leveling shaft 18 (see FIG. 1) can be threadedly engaged is formed in the portion of the side surface of the light source carrying portion 132 which faces reward with respect to the vehicle. The heat sink 130, which is made of, for example, aluminum die castings, includes the light source carrying portion 132, extension section 134, radiating fins 135, back surface section 136, radiating fins 137, screw holes 138 and screw receiving sections 176 which are all formed integrally with each other.

As shown in FIG. 1, for example, the light source module 200, includes a semiconductor light emitting element 202 such as a light emitting diode (LED), and a substrate 204 for supporting the semiconductor light emitting element 202. The substrate 204 is a heat conductive insulating substrate made of ceramic or the like. On the substrate 204, there is formed an electrode (not shown) which transmits power to the semiconductor light emitting element 202. The light source module 200 is carried on the light source carrying portion 132 in such a manner that the light emitting surface of the semiconductor light emitting element 202 faces upwardly of the vehicle and the radiation axis of the semiconductor light emitting element 202 extends substantially in the vehicle vertical direction.

The base portion 150 is a member used to support the reflector 110 and projection lens 102 (see FIGS. 1 and 2). As shown in FIGS. 5A and 5B, the base portion 150 includes a reflector mounting section 152 having a reflector placement surface 152a. The reflector mounting section 152 has a flat-plate-like shape and is disposed such that its main surface faces in the vehicle vertical direction, while the portion of the main surface which faces upwardly of the vehicle provides the reflector placement surface 152a. Also, the front end portion 152b of the reflector mounting section 152 forms a shade which is used to form the cutoff line of the low beam light distribution pattern (light distribution pattern). Specifically, the shape of an edge, which is formed by the vehicle front-side side surface of the reflector mounting section 152 and reflector placement surface 152a, corresponds to the shape of the cutoff line of the low beam light distribution pattern. The front end section 152b is disposed near the second focus of the reflection surface 110a and the rear focus of the projection lens 102.

A connecting section 156 is connected to the two right and left end sections of the reflector mounting portion 152. The connecting section 156 corresponds to a pair of arm portions which extend from the reflector mounting portion 152 toward the front of the vehicle and the leading ends of which support the lens mounting portion 154. The lens mounting section 154 is connected to the vehicle front side end portion of the connecting section 156, whereby the reflector mounting portion 152 and lens mounting portion 154 are connected together. Also, in the connecting section 156, there is formed a screw insertion hole 174 forming a connecting mechanism 170 which will be discussed later.

The lens mounting section 154 is a member having a substantially cylindrical shape. The connecting section 156 is connected to the surface of the lens mounting section 154 which faces rearward with respect to the vehicle, the projection lens 102 is fixed to the surface thereof which faces forward with respect to the vehicle. Multiple fixing pins 154a which are used to fix the projection lens 102 are provided on the surface of the lens mounting section 154, which faces forward with respect to the vehicle.

The base portion 150 is structured such that, when it is mounted on the heat sink 130, the light of the light source module 200 can be reflected by the reflector 110 mounted onto the reflector mounting section 152 and can be then applied onto the projection lens 102 mounted onto the lens mounting section 154. Also, the base portion 150 is made of, for example, resin, while the reflector mounting section 152, lens mounting section 154 and connecting section 156 of the base portion 150 are formed integrally with each other.

The base portion 150 includes pin holes 158 into which the associated fixing pins 114 can be inserted at positions corresponding to the fixing pins 114 provided on the reflector 110. The base portion 150 also includes positioning holes 160 into which their associated positioning pins 116 can be inserted at the positions corresponding to the positioning pins 116 provided on the reflector 110. In this embodiment, each of a pin hole 158 and a positioning hole 160 is formed on both the vehicle right and left sides end portions of the reflector mounting section 152. Also, the reflector placement surface 152a includes, at the positions corresponding to the butt portions 118 of the reflector 110, butt receiving portions 162 against which the associated butt portions 118 can be butted.

When the base portion 150 is mounted onto the heat sink 130, it contacts the heat sink 130. Therefore, the base portion 150 includes multiple butt portions 164 which are used to position the base portion 150 and heat sink 130 in the distance direction (in the vertical direction) thereof. The base portion 150 is carried on the heat sink 130 in such a manner that the vehicle lower side main surface of the reflector mounting section 152 faces the heat sink 130. Thus, in this embodiment, the reflector mounting section 152 includes, on the main surface thereof existing on the lower side of the vehicle, projection-shaped butt portions 164a; and, the connecting section 156 includes, on the surface thereof facing downward with respect to the vehicle, projection-shaped butt sections 164b. Specifically, the butt sections 164a are each disposed on one of the two end portions, in the vehicle width direction, of the vehicle downward side main surface of the reflector mounting section 152. Also, the butt portions 164b are disposed on the peripheral edges of the screw insertion holes 174 respectively formed on the connecting section 156. Here, the butt portion 164 may preferably be disposed on a line which passes through the screw insertion holes 174 and extends in the vehicle front and back direction. Also, the base portion 150 includes, at the positions thereof corresponding to the positioning pins 140 provided on the heat sink 130, pin holes 166 into which their associated positioning pins 140 can be inserted.

As shown in FIGS. 6A and 6B, the connecting section 156 of the base portion 150 includes multiple projecting sections 168 in the periphery of the screw insertion holes 174. The multiple projecting sections 168 are structured such that, when screws 172 respectively constituting a connecting mechanism 170 (which will be discussed later) are threadedly engaged with the screw receiving portions 176 of the heat sink 130 inserted into the screw insertion holes 174, they contact the head portions of the screws 172 and thus can be compressed by them. In this embodiment, each of the projecting sections 168 has a shape in which one side surface of a triangular prism is in contact with the surface of its associated connecting section 156 and the top portion of the prism opposed to this side surface projects upwardly; Further each projecting section 168 is structured such that, when the screw 172 is threadedly engaged with the screw receiving portion 176, the upwardly projecting top portion can be compressed.

Also, each of the multiple projecting sections 168 extends substantially perpendicularly to a straight line L which passes through the center M of the screw insertion hole 174 and the center N of the butt section 164a disposed apart from the screw insertion hole 174. In other words, each of the multiple projecting sections 168 is disposed such that the foot portion thereof in contact with the upwardly projecting top portion and the surface of the connecting section 156 extends substantially perpendicularly to the straight line L. Here, the above mentioned term "substantially perpendicularly" contains not only the case in which the projecting section 168 extends perpendicularly to the straight line L, but also all shapes which can provide the below-mentioned operation effect that the transmission amount of the pressing force of the projecting section 168 against the butt section 164a can be increased.

As shown in FIGS. 1 and 2, the projection lens 102 is made of a plano-convex aspherical lens the front side surface of which is a convex surface and the back side surface of which is a plane. The projection lens 102 is fixed to the lens mounting section 154 and is disposed on the optical axis of the optical unit 100. The second focus of the reflection surface 110a and the front end section 152b of the reflector mounting section 152 are situated near the vicinity of the rear focus of the projection lens 102. Further, the projection lens 102 functions as an optical member which condenses the radiation light of the light source module 200 and projects it forwardly with respect to the lighting apparatus.

Next, with reference to FIG. 7, FIGS. 8A and 8B, FIGS. 9A to 9C, FIG. 10, FIG. 11, and FIGS. 12A to 12F, description will be given below of the assembly of the optical unit 100.

Figure 7:
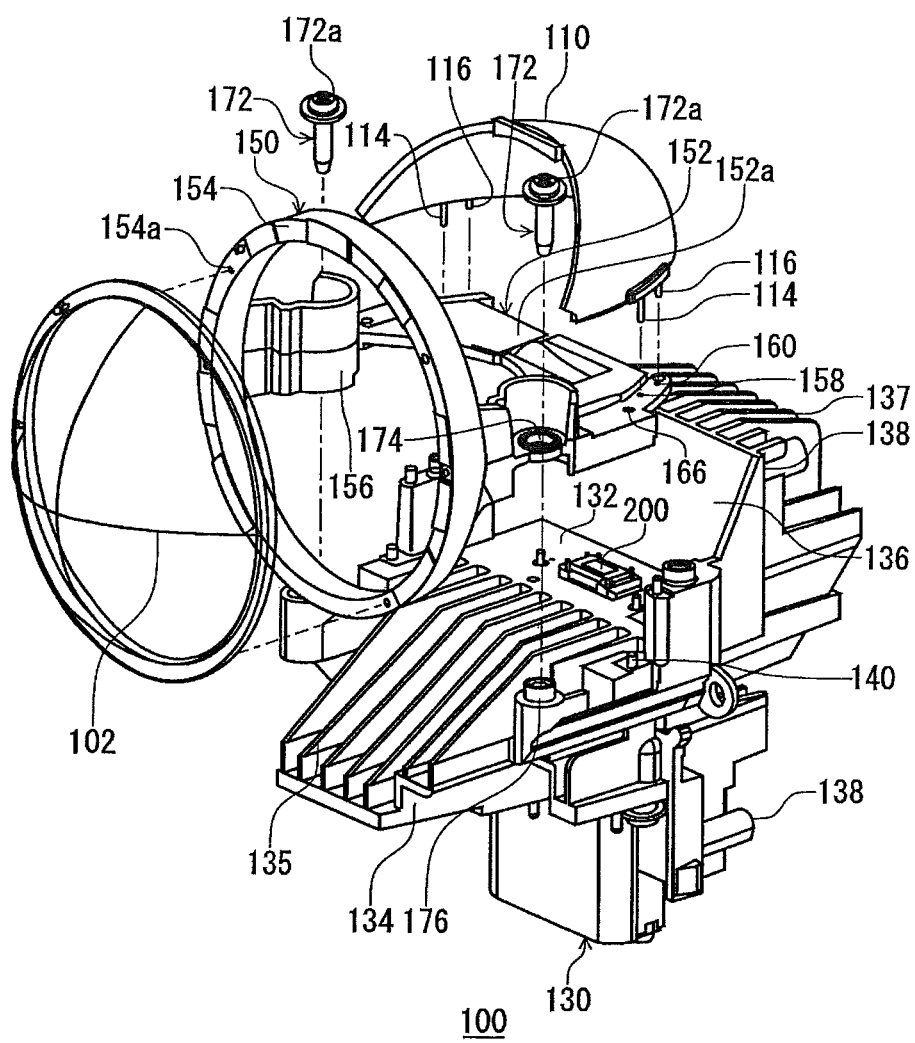
FIG. 7 is an exploded perspective view of the optical unit.
Figure 8A:
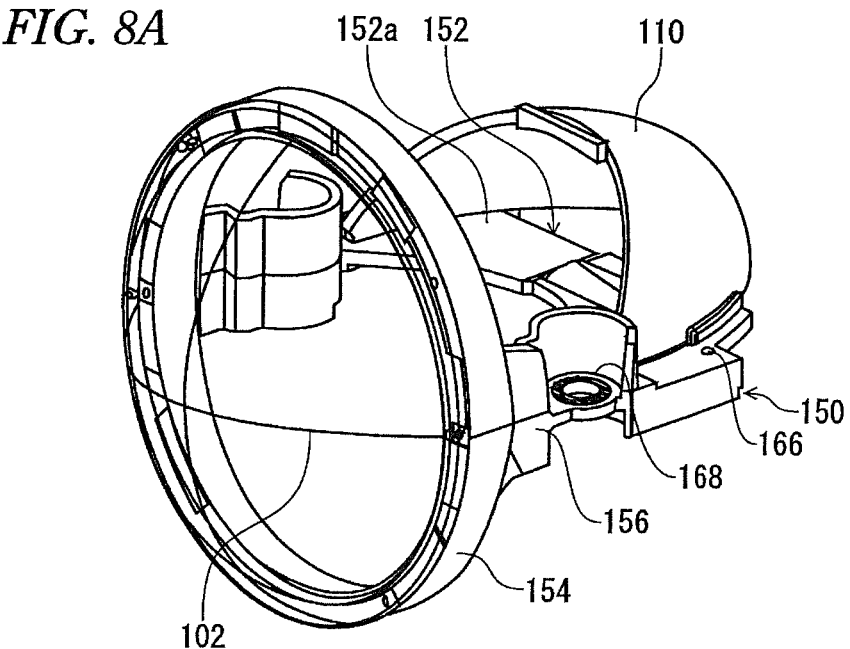
FIG. 8A is a schematic perspective view of the base portion with the reflector and projection lens mounted thereon when viewed obliquely from above.
Figure 8B:
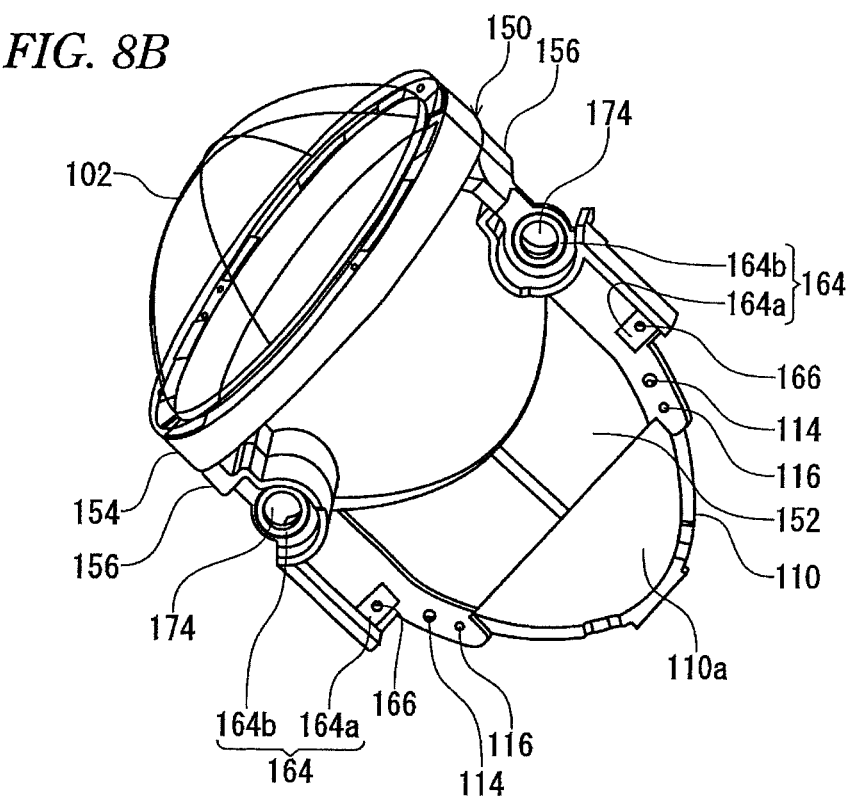
FIG. 8B is a schematic perspective view of the base portion with the reflector and projection lens mounted thereon when viewed obliquely from below.
Figure 9A:
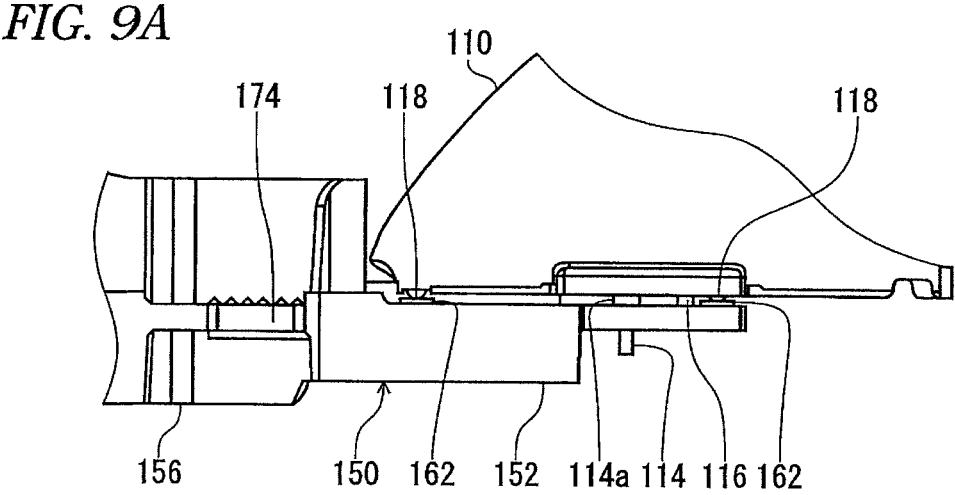
FIGS. 9A to 9C are respectively schematic views of the reflector and base portion, explaining a method for mounting the reflector onto the base portion.
Figure 9B:
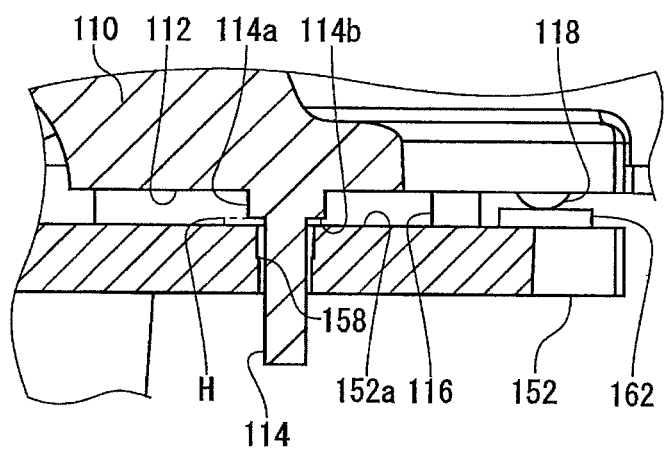
Figure 9C:
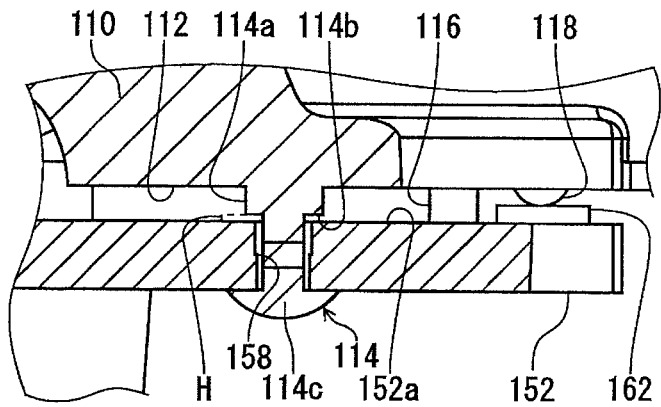
Figure 10:
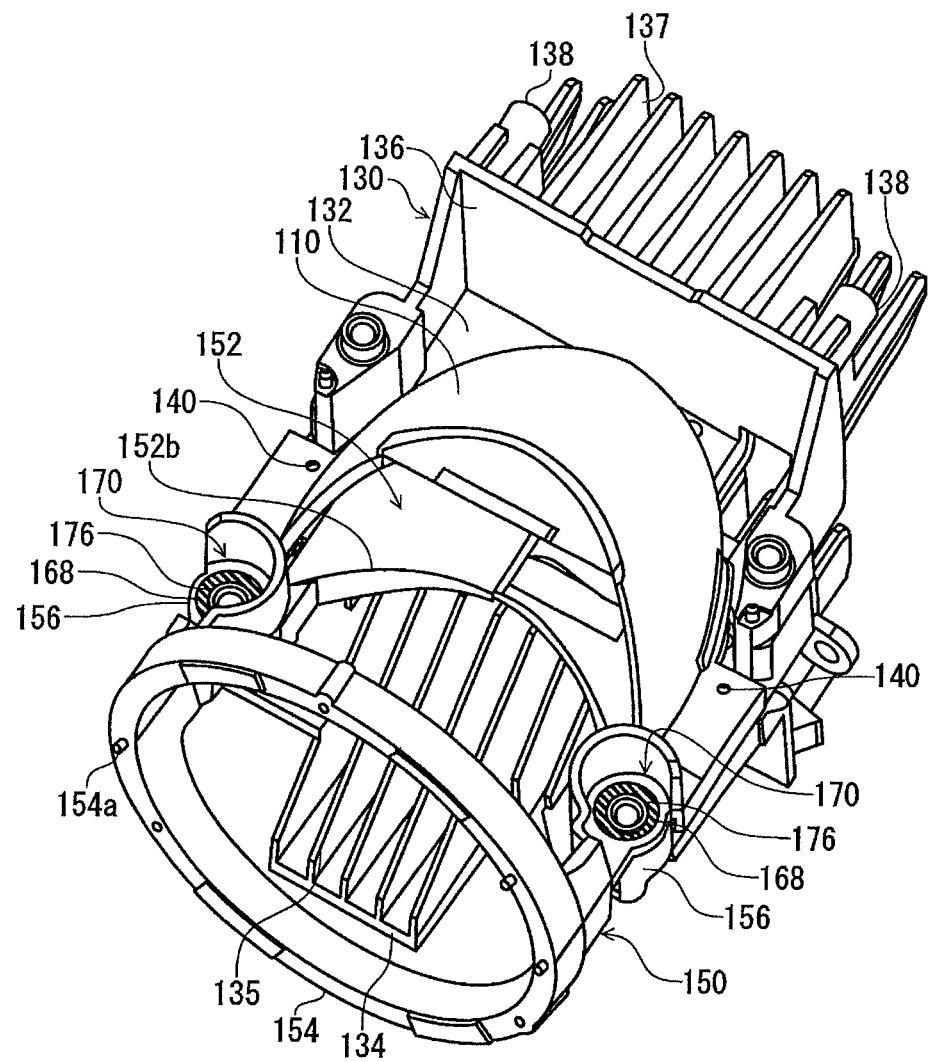
FIG. 10 is a schematic perspective view, showing state in which the base portion with the reflector and projection lens mounted thereon is mounted on the heat sink.
Figure 11:
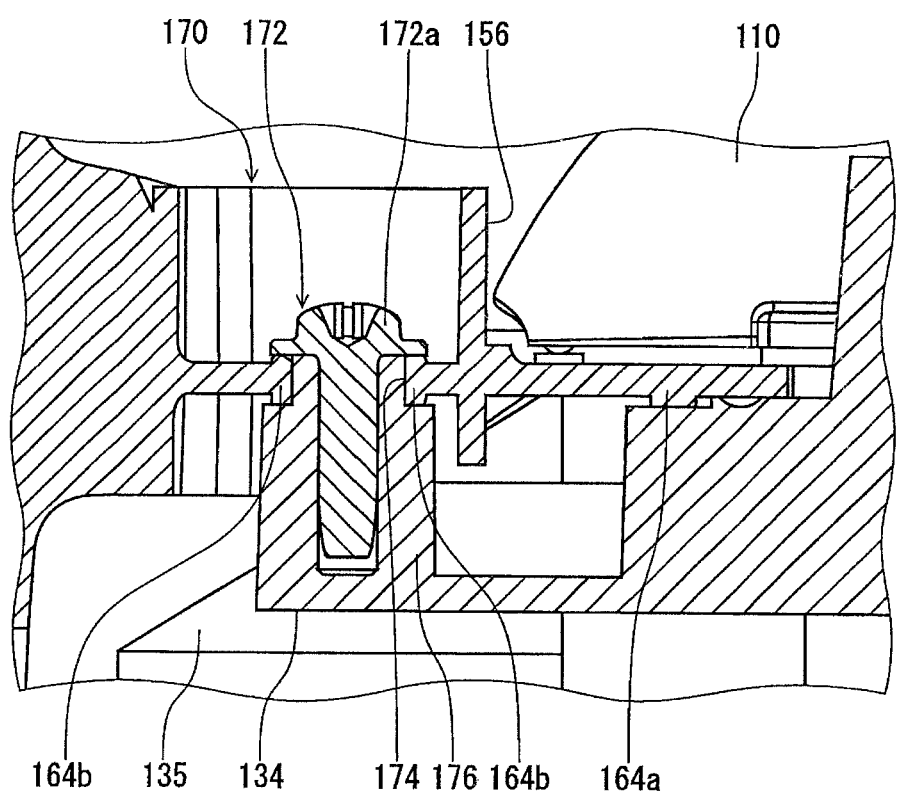
FIG. 11 is a schematic section view taken along a plane including the center axis of a screw in a state where the base portion is mounted on the heat sink.
Figure 12A:
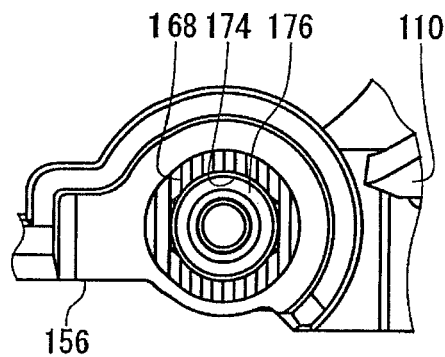
FIGS. 12A to 12F are respectively schematic views, explaining a method for mounting the base portion onto the heat sink.
Figure 12D:
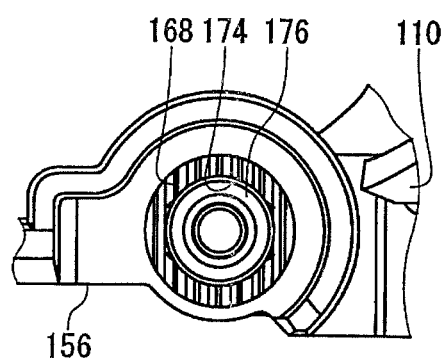
Figure 12B:
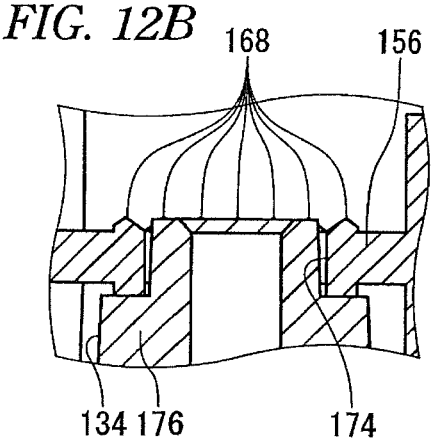
Figure 12E:
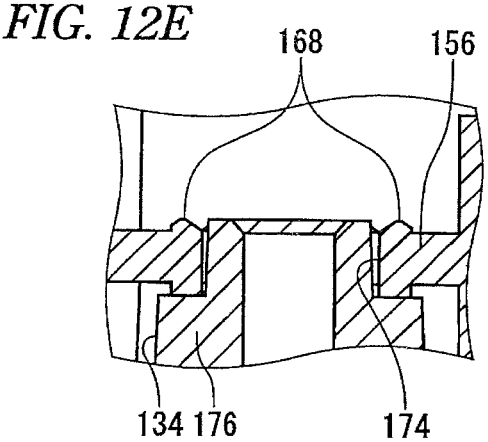
Figure 12C:
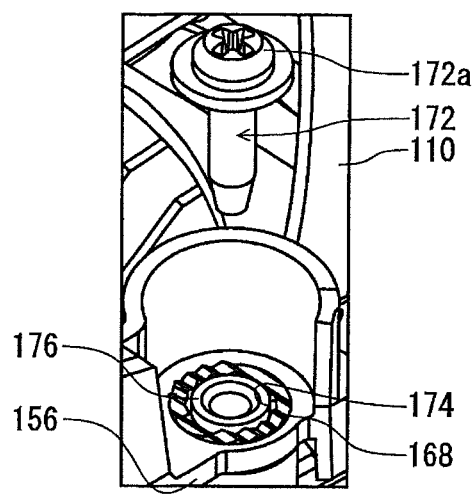
Figure 12F:
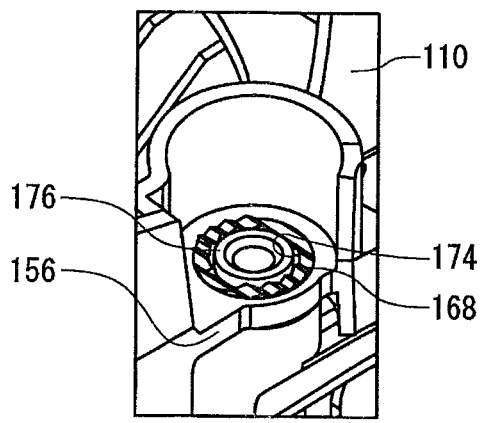

FIG. 7 is an exploded perspective view of the optical unit. FIG. 8A is a schematic perspective view of the base portion with the reflector and projection lens attached when viewed obliquely from above, and FIG. 8B is a schematic perspective view of the base portion with the reflector and projection lens attached when viewed obliquely from below. FIGS. 9A to 9C are schematic views of the reflector and base portion respectively, and explain a method for mounting the reflector onto the base portion. Specifically, FIG. 9A is a schematic side view of the vicinity of a fixing pin in a state where the reflector is attached to the base portion, FIG. 9B is a schematic section view taken along a plane including the center axis of the fixing pin in the state shown in FIG. 9A, and FIG. 9C is a schematic section view to show a state where the leading end of the fixing pin is welded to the base portion. FIG. 10 is a schematic perspective view, showing a state where the base portion with the reflector and projection lens attached to the heat sink. Here, in FIG. 10, the illustration of the projection lens 102 is omitted. FIG. 11 is a schematic section view taken along a plane including the center axis of a screw in a state where the base portion is attached to the heat sink. FIGS. 12A to 12F are respectively schematic views, explaining a method for attaching the base portion the heat sink. Specifically, FIGS. 12A to 12C show a state before they are screwed together, while FIG. 12D to 12F show a state after they are screwed together. More specifically, FIGS. 12A and 12D are respectively schematic plan views of the vicinity of the connecting portion in the respective states, FIGS. 12B and 12E are respectively schematic section views taken along a plane including the center axis of a screw insertion hole in the respective states, and FIGS. 12C and 12F are respectively schematic perspective views when the vicinity of the connecting portion in the respective states is viewed obliquely from above. In FIG. 12D to 12F, the illustration of a screw is omitted.

As shown in FIG. 7, FIGS. 8A and 8B, the projection lens 102 is disposed on the vehicle front side of the base portion 150 in such a manner that its plane faces the base portion 150. Further, while the fixing pin 154a of the lens mounting section 154 and the peripheral edge of the projection lens 102 are aligned with each other, the projection lens 102 is pressed against the lens mounting section 154. Thus, the projection lens 102 is fixed to the lens mounting section 154. Also, the reflector 110 is disposed upward of the reflector placement surface 152a in such a manner that the opposite surface 112 (see FIG. 3B) faces the reflector placement surface 152a. Further, while the fixing pin 114 of the reflector 110 and the pin hole 158 of the base portion 150 are aligned with each other and also the positioning pin 116 of the reflector 110 and the positioning hole 160 of the base portion 150 are aligned with each other, the reflector 110 is placed on the reflector placement surface 152a.

As shown in FIGS. 9A and 9B, when the reflector 110 is placed on the reflector placement surface 152a, the fixing pin 114 is inserted into the pin hole 158. The leading end portion of the fixing pin 114 inserted into the pin hole 158 is projected from the pin hole 158 onto the back surface side of the reflector placement surface 152a. Also, the positioning pin 116 is inserted into the positioning hole 160 (see FIG. 7), thereby setting the positions of the reflector 110 and base portion 150 in the front and back as well as right and left directions of the vehicle, i.e., in the horizontal direction. Also, the butt portions 118 formed on the opposite surface 112 of the reflector 110 are contacted with the butt receiving portions 162 of the reflector placement surface 152a, thereby setting the positions of the reflector 110 and base portion 150 in the vehicle upward and downward direction, i.e., in the vertical direction (in the distance direction).

As shown in FIG. 9C, on the leading end portion of the fixing pin 114 projecting from the pin hole 158, there is carried out, for example, a heat calking treatment, thereby deforming the leading end portion of the fixing pin 114, whereby there is formed a pin head portion 114c the diameter of which is larger than the opening diameter of the pin hole 158. The pin head portion 114c prevents the reflector 110 from slipping off from the base portion 150. In this embodiment, the base portion 150 is placed on the seat of a heat calking apparatus and also, under a given temperature condition, the reflector 110 is pressed toward the base portion 150 with a given pressure. Due to this, the leading end portion of the fixing pin 114 projecting from the pin hole 158 is melted and deformed to thereby form the pin head portion 114c. The thus formed pin head portion 114c is welded to the base portion 150.

Thus, in this embodiment, the fixing pin 114 is inserted into the pin hole 158, whereby the reflector 110 is fixed to the base portion 150. This can prevent the deformation of the reflector that is caused in a related structure in which the reflector is mounted onto the base portion using lance engagement. Consequently, the forming accuracy of the light distribution pattern can be enhanced. Also, in this embodiment, since the fixing pin 114 is erected on the opposite surface 112, when compared with a related structure in which the hook of a lance engagement mechanism is provided on the outside surface of the reflector 110, the outside dimension of the reflector 110 can be reduced. This can reduce the outside dimension of the optical unit 100 and the degree of freedom of design thereof.

Also, since the leading end portion of the fixing pin 114 is heat calked and is thereby welded to the base portion 150, the reflector 110 and base portion 150 can be fixed together firmly, thereby being able to positively prevent the reflector 110 from slipping off from the base portion 150. Here, the method for fixing the reflector 110 to the base portion 150 is not limited to the method for welding the leading end portion of the fixing pin 114 to the base portion 150. For example, there may be employed a method for setting the diameter of the fixing pin 114 larger than the opening diameter of the pin hole 158 and pressure inserting the fixing pin 114 into the pin hole 158. Or, the above methods may be combined together. Also, the above expression "the fixing pin 114 is inserted into the pin hole 158 and the reflector 110 is thereby fixed to the base portion 150" includes a case where, as in the heat calking treatment, the fixing pin 114 is deformed after it is inserted into the pin hole 158 to thereby fix together the reflector 110 and base portion 150, and a case where, as in the pressure insertion case, the insertion of the fixing pin 114 into the pin hole itself completes the mutual fixing of the reflector 110 and base portion 150.

In a case where the leading end portion of the fixing pin 114 is heat calked, the reflector 110 is pressed toward the base portion 150. Due to this, there is a fear that the portion of the reflector 110 existing between the two butt portions 118 can be flexed with the butt portion 118 existing on the vehicle front side of the fixing pin 114 and the butt portion 118 existing on the vehicle backside as the fulcrums thereof and, consequently, the reflection surface 110a can be deformed. On the other hand, the fixing pin 114 according to this embodiment, as shown in FIGS. 9B and 9C, includes, in a portion thereof which is stored within an area interposed between the opposite surface 112 and reflector placement surface 152a, a large diameter portion 114a having a larger diameter than the pin hole 158. Therefore, only the portion of the fixing pin 114 existing nearer to the leading end portion than the large diameter portion 114a can be inserted into the pin hole 158. This can prevent the excessive insertion of the fixing pin 114 into the pin hole 158 and consequently deformation of the reflection surface 110a. That is, since the insertion amount of the fixing pin 114 into the pin hole 158 can be controlled, the deflection of the reflector 110 due to pressure in the heat calking treatment can be reduced and thus the deformation of the reflection surface 110a can be avoided.

Also, the large diameter portion 114a includes a parallel surface 114b parallel to the reflector placement surface 152a. Therefore, when the fixing pin 114 goes into the pin hole 158 and the large diameter portion 114a arrives at the reflector carrying surface 152a, the parallel surface 114b and reflector placement surface 152a are in surface contact with each other to thereby prevent the fixing pin 114 from advancing any further. Thus, the excessive insertion of the fixing pin 114 into the pin hole 158 can be prevented more positively. Also, in a state after execution of the heat calking treatment on the fixing pin 114, that is, in a state after the application of pressure to the reflector 110 and base portion 150 is removed, there is formed a space H between the parallel surface 114b and reflector placement surface 152a. Such formation of the space H between the parallel surface 114b and reflector placement surface 152a makes it possible to omit the highly accurate surface height control of the parallel surface 114b, thereby being able to prevent the complicated manufacturing process of the base portion 150.

Next, as shown in FIGS. 7 and 10, the light source module 200 is carried on the light source carrying portion 132 of the heat sink 130, whereby the light source module 200 is fixed to the heat sink 130. Also, the base portion 150 with the projection lens 102 and reflector 110 mounted thereon is disposed upward of the light source carrying portion 132 of the heat sink 130. Further, while the pin hole 166 of the base portion 150 and the positioning pin 140 of the heat sink 130 are aligned with each other, and the screw insertion hole 174 formed in the connecting section 156 of the base portion 150 and the screw receiving section 176 formed in the extension portion 134 of the heat sink 130 are aligned with each other, the base portion 150 is placed onto the heat sink 130. In a state where the base portion 150 is placed on the heat sink 130, the reflector mounting portion 152 contacts with the upper surface of the light source carrying portion 132 which is exists more forward with respect to the vehicle than the light source module 200 and the upper surface of the radiating fin 135 which is rearward with respect to the vehicle. Also, the positioning pin 140 is inserted into the pin hole 166, whereby the base portion 150 and heat sink 130 are aligned with each other in the horizontal direction. Further, the butt sections 164a and 164b of the base portion 150 contact with the heat sink 130, whereby the base portion 150 and the heat sink 130 are aligned with each other in the spacing direction (see FIG. 1). Further, the leading end of the screw receiving section 176 is inserted into the screw insertion hole 174.

Additionally, a screw 172 having a head portion 172a is inserted through the screw insertion hole 174 and is thereby threadedly engaged with the screw receiving section 176. Here, as shown in FIG. 11, the connecting mechanism 170 for connecting the base portion 150 and heat sink 130 includes the screw 172 having the head portion 172a, screw insertion hole 174 formed in the connecting section 156 and screw receiving section 176 formed in the extension portion 134. Specifically, since the screw 172 is inserted through the screw insertion hole 174 and is thereby threadedly engaged with the screw receiving section 176, the connecting section 156 is sandwiched by the head portion 172a of the screw 172 and extension portion 134. The connecting mechanism 170 connects together with the connecting portion 156 and extension portion 134 in this manner, thereby connecting together the base portion 150 and heat sink 130.

As shown in FIGS. 12A to 12C, the upper surface of the screw receiving section 176 inserted into the screw insertion hole 174, before it is fastened by the screw 172, exists lower than the top part of the projecting section 168. Additionally, the screw 172 is inserted into the screw receiving section 176 until the lower surface of the head portion 172a contacts contacted the upper surface of the screw receiving section 176 (see FIG. 11). As a result, the head portion. 172a of the screw 172 is pressed against the top part of the projecting section 168, which is upward of the upper surface of the screw receiving portion 176, whereby the connecting section 156 is pressed toward the extension section 134. Further, the butt section 164 of the connecting section 156 is pressed against the heat sink 130 to thereby fix the base portion 150 to the heat sink 130.

In this case, as shown in FIGS. 12D to 12F, the top part of the projecting section 168, which is upward of the upper surface of the screw receiving portion 176, is compressed and is thereby deformed plastically. Further, the force for compressing the projecting section 168 is transmitted to the butt section 164 to thereby be able to positively press the butt section 164 against the heat sink 130. That is, the projecting section 168 functions as a compressing margin for fixing the base portion 150 to the heat sink 130.

The more distant the butt section 164 is from the contact portion between the screw 172 and projecting section 168, the harder the butt section 164 is to receive the projecting section 168 compressing force. Therefore, the force to be transmitted to the butt section 164a disposed distant from the connecting mechanism 170 is small when compared with the butt section 164b formed just below the area of the projecting section 168. In view of this in this embodiment, the projecting section 168 is formed such that it extends substantially perpendicularly to the straight line L passing through the center M of the screw insertion hole 174 and the center N of the butt section 164a (see FIG. 6A). The force to press or compress the projecting section 168 can be transmitted in a direction spreading from the top part of the projecting section 168 toward the foot thereof. Therefore, the multiple projecting sections 168 may be arranged such that the top and foot portions thereof extend substantially perpendicular to the straight line L, whereby the transmission directions of the pressing forces from the respective projecting sections 168 may be arranged toward the butt sections 164a. This can increase the amount of the forces transmitted to the butt sections 164a to press the projecting sections 168. Thus, the butt sections 164a can be pressed against the heat sink 130 firmly, whereby the alignment between the heat sink 130 and base portion 150 in the distance direction can be made more accurately.

Also, in this embodiment, the butt section 164b is situated just below the contact portion between the screw 172 and projecting section 168. This allows the butt section 164b to function as a base member, which can prevent deformation of the base portion 150 that might otherwise be caused when the connecting portion 156 is sandwiched by the head portion 172a of the screw 172 and extension section 134.

In the optical unit 100 structured such that the reflector 110, heat sink 130 and base portion 150 are assembled in the above-mentioned manner, light emitted from the light source module 200 is reflected by the reflection surface 110a of the reflector 110, is allowed to pass through the vicinity of the front end section 152b of the reflector mounting section 152, and is then incident onto the projection lens 102. Light incident on the projection lens 102 is condensed by the projection lens 102 and then radiated forward with respect to the vehicle. Thus, a low beam light distribution pattern can be formed in front of the vehicle.

As shown in FIGS. 2 and 10, in the optical unit 100 according to this embodiment, the extension section 134 of the heat sink 130 passes below the reflector mounting section 152 and extends more forwardly in the optical axis direction than the front end section 152b of the reflector mounting section 152. Further, the extension section 134 is connected to the connecting section 156 of the base portion 150 by the connecting mechanism 170. The center of gravity of the base portion 150 exists near the front portion of the vehicle because the projection lens 102 having relatively large mass is mounted on the front end portion of the base portion 150. Therefore, a position for connecting together the base portion and heat sink is distant from the center of gravity of the base portion in a related structure in which a base portion is mounted onto a heat sink using a fastening screw extending from the back surface side of the heat sink. On the other hand, in the optical unit 100 according to this embodiment, the base portion 150 and heat sink 130 are connected together at a position nearer to the center of gravity of the base portion 150 than the related structure. Therefore, when compared with the related structure, the rigidity of the optical unit 100 with respect to vibrations and the like from outside can be enhanced.

Also, in the related structure, since the fastening screw is inserted into the heat sink from the back surface side of the heat sink, a radiating fin cannot be disposed in the area of the heat sink into which the fastening screw is inserted. On the other hand, according to this embodiment, since the connecting section 156 and extension section 134 are connected together, when compared with the related structure, the number of radiating fins that can be provided on the back surface of the heat sink 130, or the areas of the respective radiating fins can be increased. This can enhance the heat radiation property of the optical unit 100 further.

Further, as described above, the extension section 134 of the heat sink 130 passes below the reflector mounting section 152 and extends further forwardly than the front end section 152b of the reflector mounting section 152. Therefore, when compared with the related structure in which the radiating fins are provided only on the back surface side of the heat sink, the radiating fins 135 can be disposed nearer to the light source module 200 and the number of radiating fins can be increased. This can further enhance the heat radiation property of the optical unit 100. Also, since providing the radiating fins 135 in the extension section 134 can reduce the number or area of radiating fins 137 to be provided on the back surface section 136 side while maintaining the heat radiation property of the optical unit 100, the dimension of the optical unit 100 in the vehicle front and back directions can be reduced.

Also, in the optical unit 100 according to this embodiment, the extension section 134 of the heat sink 130 is exposed to a space surrounded by the lens mounting section 154, connecting section 156 and reflector mounting section 152 of the base portion 150. In a related optical unit, a base portion includes a plane section corresponding to the reflector mounting section 152 and disposed substantially horizontally, and a bent section situated more forwardly than the plane section and bent downwardly so as to not shut out the light of the light source incident onto a projection lens. In such related optical unit, sunlight incident through a projection lens is concentrated in the vicinity of the bent section of the base portion, thereby raising a fear that the resin-made base portion can be deformed or melted and damaged. As a method for preventing the deformation or melting damage of the base portion, there can be expected a method for forming the base portion of material having a high heat-resisting property, or a method for moving the bent section backwardly in the optical axis direction to keep it away from the sunlight concentrating portion. However, these methods increase the manufacturing cost and size of the optical unit. On the other hand, in the optical unit 100 according to this embodiment, the extension section 134 constituting a part of the heat sink 130 is exposed to the space surrounded by the lens mounting section 154, connecting section 156 and reflector mounting section 152. That is, the extension section 134 is disposed in the area where the bent section in the related structure exists. Therefore, without increasing the manufacturing cost and size of the optical unit, there can be eliminated the fear that the base portion can be deformed or melted due to the concentrated sunlight.

Generally, in order to enhance the utilization rate of the light of the light source module, silver or the like is deposited on the base portion to enhance the light reflectance of the base portion. Thus, in the related structure, there is a possibility that the light of the light source module outer-surface reflected by the incident surface of the projection lens can be reflected by the bent section of the shade and can be incident onto the projection lens, whereby the light can be radiated from the projection lens forward with respect to the vehicle. In the case that the light is reflected by the bent section and is then radiated forward with respect to the vehicle, there is a possibility that it can be out of the radiation range of a light distribution pattern to be formed. This raises a fear that glare can be caused for other vehicles. On the other hand, in this embodiment, because there is disposed the extension section 134 in the area where the bent section in the related structure exists, it is possible to reduce the fear of giving glare to the other vehicles.

Also, in this embodiment, the screw insertion hole 174 is formed in the base portion 150 and the screw receiving portion 176 is formed in the heat sink 130. Therefore, even in such section of the extension section 134 as exists on the back surface side of the screw receiving portion 176, there can be provided radiating fins. This can further enhance the heat radiation property of the optical unit 100.

Figure 13:
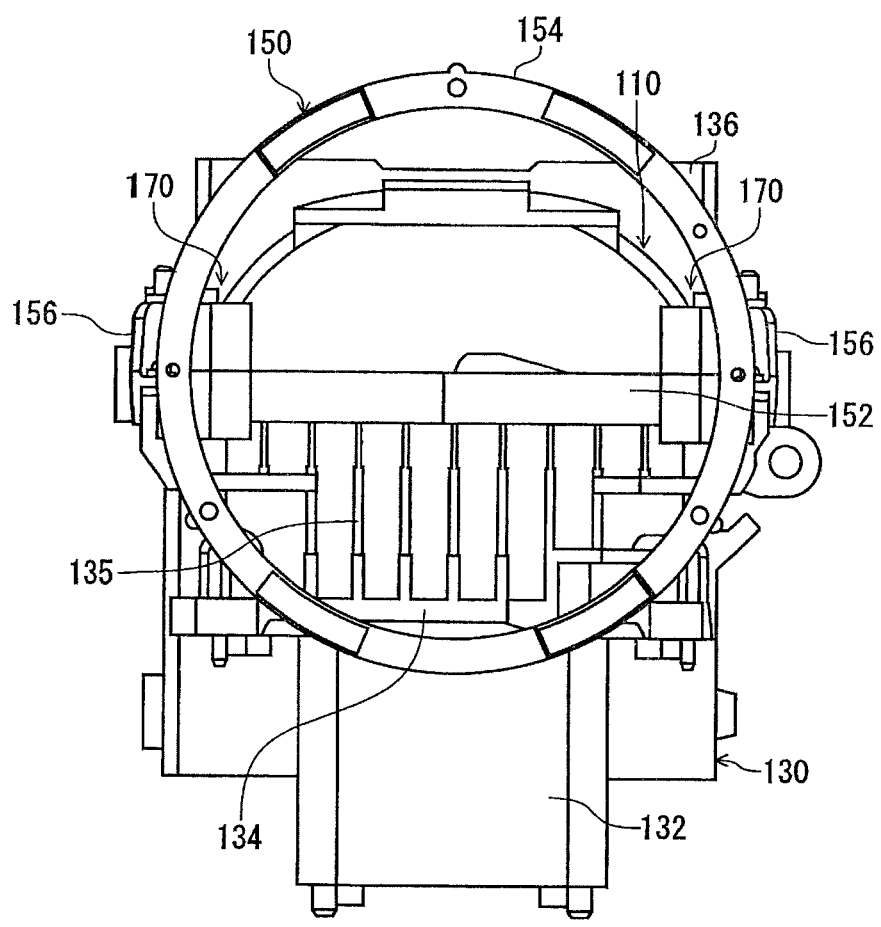
FIG. 13 is a schematic front view of the optical unit according to the first embodiment.

FIG. 13 is a schematic front view of the optical unit according to the first embodiment. Here, in FIG. 13, the illustration of the projection lens 102 is omitted. As shown in FIG. 13, in the optical unit 100 according to this embodiment, the connecting mechanism 170 is situated at a position where, when the optical unit 100 is viewed from the front thereof, it is overlapped with the projection lens 102 mounted onto the lens mounting section 154. Further, in this embodiment, the center axis of the screw insertion hole 174 is situated further inward with respect to the vehicle width direction than the end section of the lens mounting section 154 (see FIG. 10). Also, the connecting mechanism 170 is disposed outside the area through which the light reflected by the reflection surface 110a of the reflector 110 passes. Thus, the size of the optical unit 100 can be reduced because the connecting mechanism 170 is disposed in the area in which it is has no influence on the formation of the light distribution pattern and it is overlapped by the projection lens, when viewed from the front of the optical unit 100. Also, in the optical unit 100 according to this embodiment, the radiating fins 135 provided in the extension section 134 are seen from outside through the projection lens to be mounted onto the lens mounting section 154. Therefore, the appearance of the optical unit 100 can be made novel and thus the quality of design of the optical unit 100 can be enhanced.

As has been described above, in the optical unit 100 according to this embodiment, the reflector 110 includes the fixing pin 114 on the opposite surface 112, while the base portion 150 includes the pin hole 158 at a position corresponding to the fixing pin 114. The fixing pin 114 is inserted into the pin hole 158 to thereby fix the reflector 110 to the base portion 150. Therefore, when compared with the related structure where the reflector is mounted onto the base portion through the lance engagement, there can be reduced the fear that the reflector 110 can be deformed. Thus, the forming accuracy of the light distribution pattern can be enhanced. Also, when compared with the related structure using the lance engagement, the shapes of the reflector 110 and base portion 150 can be simplified and also the outside dimension of the reflector 110 can be reduced.

Also, in the optical unit 100 according to this embodiment, the base portion 150 includes the connecting section 156 for connecting together the reflector mounting section 152 and lens mounting section 154, while the heat sink 130 includes the extension section 134 which passes below the reflector mounting section 152 and extends more forward in the optical axis direction than the front end section 152b of the reflector mounting section 152. The extension section 134 and connecting section 156 are connected together by the connecting mechanism 170. Therefore, when compared with the related structure in which the base portion is mounted onto the heat sink using the fastening screw extending from the back surface side of the heat sink, the connecting position of the base portion 150 and heat sink 130 can be made to approach the center of gravity of the base portion 150. This can enhance the rigidity of the optical unit 100.

Further, in the optical unit 100 according to this embodiment, the extension section 134 of the heat sink 130 is exposed to the space surrounded by the lens mounting section 154, connecting section 156 and reflector mounting section 152 of the base portion 150. This can prevent such deformation and melting damage of the base portion due to the concentration of the sunlight that can be possibly caused in the related structure including a plane portion arranged substantially horizontally and a bent portion existing forward of the plane portion and bent downward in order to not to shut off the light from the light source incident onto the projection lens. Also, in the optical unit 100 according to this embodiment, by disposing the extension section 134 of the heat sink 130 in the area where the bent portion is located in the related structure, the base portion can be prevented against melting damage or the like. Therefore, when compared with a structure in which the bent portion is kept away from the concentrating portion of the sunlight, an increase in the manufacturing cost and size of the optical unit 100 can be avoided.

The invention is not limited to the above-described embodiment but various modifications such as design change can also be added based on the knowledge of a person skilled in the art. An embodiment with such modifications added thereto also falls within the scope of the invention. A new embodiment provided by a combination of the above-mentioned embodiment with the following modification provides both of the effects that can be provided by the embodiment and modification combined.

Figure 14:
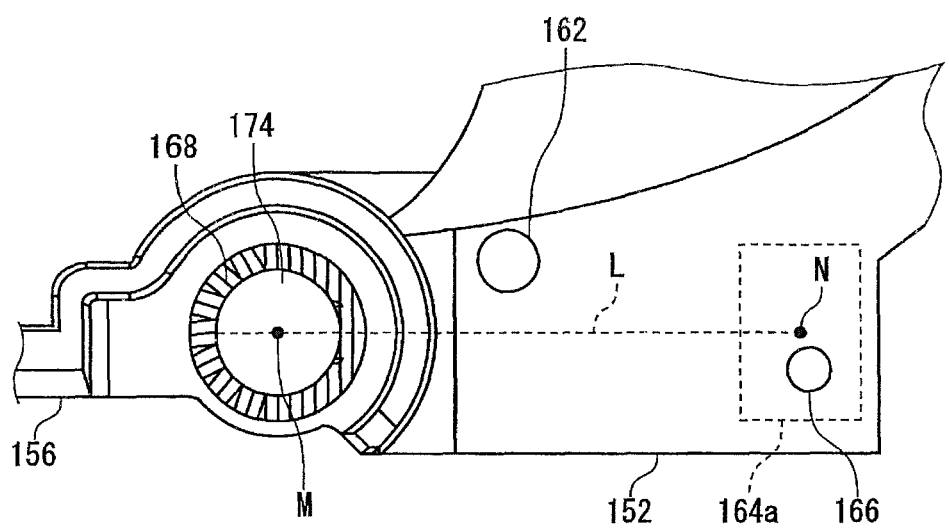
FIG. 14 is a schematic plan view of the vicinity of the connecting section of the base portion according to a modification.

FIG. 14 is a schematic plan view of the vicinity of the connecting section of the base portion in an optical unit according to a modification. As shown in FIG. 14, in an optical unit 100 according to the modification, a projecting portion 168, in part, extends radially with respect to the center M of a screw insertion hole 174, whereas the remaining portions thereof extend substantially perpendicularly to a straight line L. Specifically, a portion of the projecting portion 168 located near a butt section 164a extends substantially perpendicularly to a straight line L, whereas the portion thereof that is distant from the butt section 164a extends radially with respect to the center M. In this modification, the projecting sections 168, which have positions in the vehicle front and back direction that are the same as the center M of the screw insertion hole 174 or are situated rearward of the center M, are set to intersect the straight line L substantially at right angles, whereas the projecting sections 168 situated more forward with respect to the vehicle than the center M are set to extend radially.

When the projecting sections 168 are disposed radially, the forces for pressing the projecting sections 168 by the screw 172 are easy to transmit in different directions in the respective projecting sections 168, whereby the forces for pressing the projecting sections 168 can be diffused. Therefore, the amount of forces transmitted to press the projecting sections 168 and to be transmitted to the butt sections 164 can be reduced. On the other hand, since a butt section 164b is disposed in the peripheral edge of the screw insertion hole 174, there is a fear that the force for pressing the projecting portion 168 could be excessively transmitted to the butt section 164b. Therefore, in this modification, the projecting sections 168 existing near the butt section 164a are disposed substantially perpendicular to the straight line L, thereby increasing the amount of the forces transmitted to press the projecting sections 168 and transmitted to the butt section 164a spaced apart from the contact portion between the screw 172 and projecting section 168; Additionally, the projecting sections 168 existing in the other portions are arranged radially, thereby reducing the amount of the forces transmitted to press the projecting sections 168 and to be transmitted to the butt section 164b formed just below the contact portion. This can eliminate the possibility that an excessive pressing force can be applied to the extension section 134 through the butt portion 164b. This can eliminate the fear that, when the base portion 150 and heat sink 130 are connected together, the respective portions thereof can be deformed or damaged. Thus, the yield of the optical unit 100 can be enhanced.

Although, in the above embodiment, the fixing pin 114 is provided on the opposite surface 112 of the reflector 110 and the pinhole 158 is formed in the reflector placement surface 152a of the base portion 150, the fixing pin 114 may also be provided on the reflector placement surface 152a and the pin hole 158 may be formed in the opposite surface 112. Also, although, the butt portion 118 is formed in the opposite surface 112 in the above embodiment, the butt portion 118 may also be formed in the reflector placement surface 152a. In this case, the butt portion 118 contacts with the opposite surface 112 to thereby align the reflector 110 and base portion 150 in the distance direction. Further, although, in the above embodiment, the butt section 164 is formed in the base portion 150, the butt section 164 may also be formed in the heat sink 130.

In the above embodiment, the optical unit 100 is used to form the low beam light distribution pattern and the front end section 152b of the reflector mounting section 152 constitutes a shade for forming the cutoff line of the low beam light distribution pattern. Alternatively, the optical unit 100 may also be structured such that it is used to form a high beam light distribution pattern and other light distribution patterns.

In the above embodiment, in order to prevent the excessive insertion of the fixing pin 114 into the pin hole 158, the fixing pin 114 is structured to include the large diameter portion 114a. However, the structure to prevent the excessive insertion of the fixing pin 114 into the pin hole 158 is not specifically limited to this structure. For example, on the portion of the opposite surface 112 located in the periphery of the fixing pin 114, there may be provided a projecting portion which projects toward the reflector placement surface 152a. Alternatively, on the portion of the reflector placement surface 152a located in the periphery of the pin hole 158, there may be provided a projecting portion projecting toward the opposite surface 112. The height of these projecting portions may be the same as the height, for example, of the large diameter portion 114a, i.e., the distance from the opposite surface 112 to the parallel surface 114b. Also, these projecting portions may also have a top surface parallel to the reflector placement surface 152a or the opposite surface 112 to which they are opposed. In these cases, when the fixing pin 114 is inserted into the pin hole 158 and the reflector 110 is thereby pressed toward the base portion 150, the projecting portions contact with the reflector placement surface 152a or the opposite surface 112 to which they are opposed, thereby preventing the excessive insertion of the fixing pin 114 into the pin hole 158. For example, the above-mentioned projecting portions respectively have a substantially rectangular shape when viewed from above and, specifically, one of them is disposed more forward with respect to the vehicle than the pin hole 158, while the other is disposed more reward with respect to the vehicle than the pin hole 158. Further, these two projecting portions are disposed such that their longitudinal directions are substantially parallel to the vehicle width direction.

What is claimed is:

1. An optical unit comprising:
   a heat sink that radiates heat from a light source; and
   a base portion including
      a reflector mounting section, a lens mounting section and a connecting section connecting the reflector mounting section and the lens mounting section,
   wherein the base portion is configured such that light from the light source is reflected by a reflector mounted onto the reflector mounting section and is incident onto a projection lens mounted onto the lens mounting section,
   wherein the heat sink is exposed to a space surrounded by the lens mounting section, the connecting section and the reflector mounting section,
   wherein the base portion further includes another connecting section,
   wherein the connecting sections are disposed across the light source, and
   wherein the heat sink is disposed between the connecting sections.

2. The optical unit of claim 1, wherein the connecting sections are arranged in a vehicle right and left direction.

3. An optical unit comprising:
   a heat sink that radiates heat from a light source; and
   a base portion including
   a reflector mounting section,
   a lens mounting section, and
   a connecting section connecting the reflector mounting section and the lens mounting section,
   wherein the base portion is configured such that light from the light source is reflected by a reflector mounted onto the reflector mounting section and is incident onto a projection lens mounted onto the lens mounting section,
   wherein the heat sink passes through an opening defined by the lens mounting section, the connecting section, and the reflector mounting section, and
   wherein the heat sink is structurally independent from the lens mounting section, the connecting section, and the reflector mounting section.

4. The optical unit of claim 3, wherein the heat sink extends to a vicinity of the projection lens.

5. The optical unit of claim 4,
   the heat sink includes an extension section that extends to the vicinity of the projection lens, and
   the heat sink includes a plurality of radiating fins that:
      are disposed on a surface of the extension section,
      extend from the surface of the extension section in a direction intersecting the surface of the extension section, and
      are arranged along the surface of the extension section.

6. The optical unit of claim 5,
   wherein the plurality of radiating fins extend upwardly from the surface of the extension section, and
   wherein the plurality of radiating fins are arranged in a vehicle right and left direction.

7. The optical unit of claim 3, wherein the heat sink extends to a position at which sunlight being incident through the projection lens is concentrated.

8. The optical unit of claim 3,
wherein the base portion further includes another connecting section,
wherein the connecting sections are disposed across the light source, and
wherein the heat sink is disposed between the connecting sections.

* * * * *